US012622768B2

(12) United States Patent
Ruiz-Vela et al.

(10) Patent No.: US 12,622,768 B2
(45) Date of Patent: May 12, 2026

(54) ORTHODONTIC APPLIANCE FOR CORRECTING MISALIGNMENT OF TEETH

(71) Applicant: World Class Technology Corporation, McMinnville, OR (US)

(72) Inventors: Alberto Ruiz-Vela, Rancho Cucamonga, CA (US); Juergen Bathen, McMinnville, OR (US)

(73) Assignee: WORLD CLASS TECHNOLOGY CORPORATION, McMinnville, OR (US)

( * ) Notice: Subject to any disclaimer, the term of this patent is extended or adjusted under 35 U.S.C. 154(b) by 174 days.

(21) Appl. No.: 18/352,093

(22) Filed: Jul. 13, 2023

(65) Prior Publication Data

US 2024/0016582 A1      Jan. 18, 2024

Related U.S. Application Data

(60) Provisional application No. 63/368,441, filed on Jul. 14, 2022.

(51) Int. Cl.
*A61C 7/36* (2006.01)
*A61C 7/14* (2006.01)
(Continued)

(52) U.S. Cl.
CPC ................ *A61C 7/36* (2013.01); *A61C 7/146* (2013.01); *A61C 7/18* (2013.01); *A61C 7/303* (2013.01)

(58) Field of Classification Search
CPC ....................................................... A61C 7/36
See application file for complete search history.

(56) References Cited

U.S. PATENT DOCUMENTS 597,582 A * 1/1898 Knapp ..................... A61C 7/10
                                                           433/7
5,120,218 A * 6/1992 Hanson .................... A61C 7/36
                                                           433/19
(Continued)

FOREIGN PATENT DOCUMENTS

AU        2006202089 B2    10/2011
CA        2547433 C        9/2011
(Continued)

OTHER PUBLICATIONS

American Orthodontics, PowerBar Class II Corrector, https://www.americanortho.com/products/fixed-and-functional/powerbar-class-2-corrector/, retrieved on Nov. 6, 2024, 6 pages.
(Continued)

*Primary Examiner* — Ralph A Lewis
(74) *Attorney, Agent, or Firm* — Stoel Rives LLP

(57) ABSTRACT

An orthodontic device for treating misalignment of teeth, the device including an anchor having an attachment base and a stem extending upwardly from the attachment base, where the attachment base is configured for mounting the anchor to a patient's tooth. The device further includes an arm with an elongate body having an attachment portion disposed along one end thereof and a bonding portion disposed along an opposite end thereof. The attachment portion includes a notch formed along an end face thereof and a seat in communication with the notch. The arm is removably mountable to the stem via the notch and the seat, the arm being rotatable about a rotational axis relative to the stem to a locked position where the arm is bonded in place to another tooth via the bonding portion for treatment.

17 Claims, 6 Drawing Sheets

(51) Int. Cl.
    *A61C 7/18*           (2006.01)
    *A61C 7/30*           (2006.01)

(56) References Cited

U.S. PATENT DOCUMENTS

| | | | | |
|---|---|---|---|---|
| 5,620,321 | A * | 4/1997 | Thornburg | A61C 7/36 |
| | | | | 433/7 |
| 6,976,839 | B2 | 12/2005 | Lluch | |
| 7,018,202 | B2 * | 3/2006 | Teramoto | A61C 7/22 |
| | | | | 433/21 |
| 7,238,022 | B2 | 7/2007 | Lluch | |
| 7,618,257 | B2 | 11/2009 | Lluch | |
| 9,539,066 | B2 | 1/2017 | Dickerson | |
| 9,827,072 | B2 | 11/2017 | Carriere Lluch | |
| 9,848,960 | B2 | 12/2017 | Dickerson | |
| 9,987,104 | B2 | 6/2018 | Carriere Lluch | |
| 9,993,317 | B2 | 6/2018 | Kottemann et al. | |
| 10,064,706 | B2 | 9/2018 | Dickerson | |
| 10,201,450 | B2 * | 2/2019 | Vincent | A61C 7/08 |
| 10,433,932 | B2 | 10/2019 | Carriere Lluch | |
| 10,945,814 | B2 | 3/2021 | Carriere Lluch | |
| 11,911,237 | B2 * | 2/2024 | Navarro | A61C 7/28 |
| 2019/0110866 | A1 * | 4/2019 | Nagai | A61C 7/08 |
| 2019/0231486 | A1 | 8/2019 | Dickerson | |
| 2019/0328492 | A1 | 10/2019 | Dickerson | |
| 2020/0085539 | A1 | 3/2020 | Carriere Lluch | |
| 2020/0188061 | A1 | 6/2020 | Carriere Lluch | |
| 2022/0331069 | A1 * | 10/2022 | Shannon | A61C 7/28 |
| 2024/0016582 | A1 * | 1/2024 | Ruiz-Vela | A61C 7/146 |

FOREIGN PATENT DOCUMENTS

| | | | |
|---|---|---|---|
| EP | 1723927 | B1 | 8/2009 |
| WO | 2020136186 | A1 | 7/2020 |

OTHER PUBLICATIONS

TOC Orthodontics & Specialist Dental Supplies, "D2 Applicance", Class II Corrector, https://www.tocdental.com/d2-appliance/p1108, retrieved on Nov. 6, 2024, 4 pages.

Henry Schein Orthodontics, "Carriere Motion 3D Class II & III Appliances", Quick Start Guide, Ortho Organizers, Inc., Jun. 1, 2018, 35 pages.

* cited by examiner

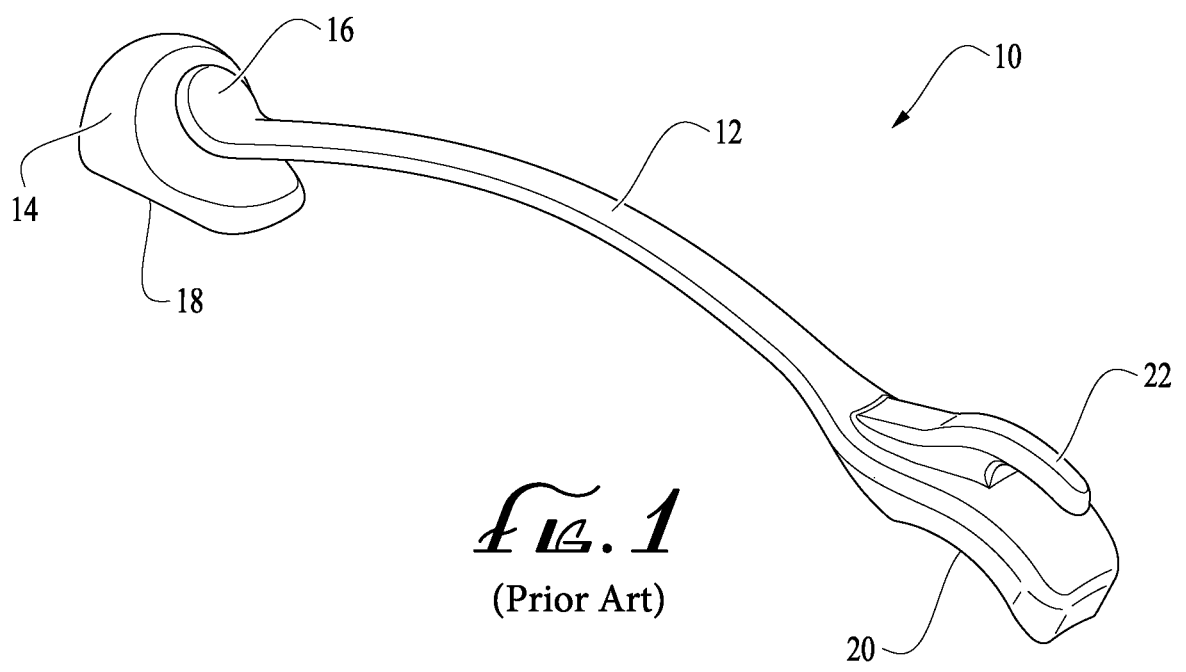
*ғɪɢ.1*
(Prior Art)
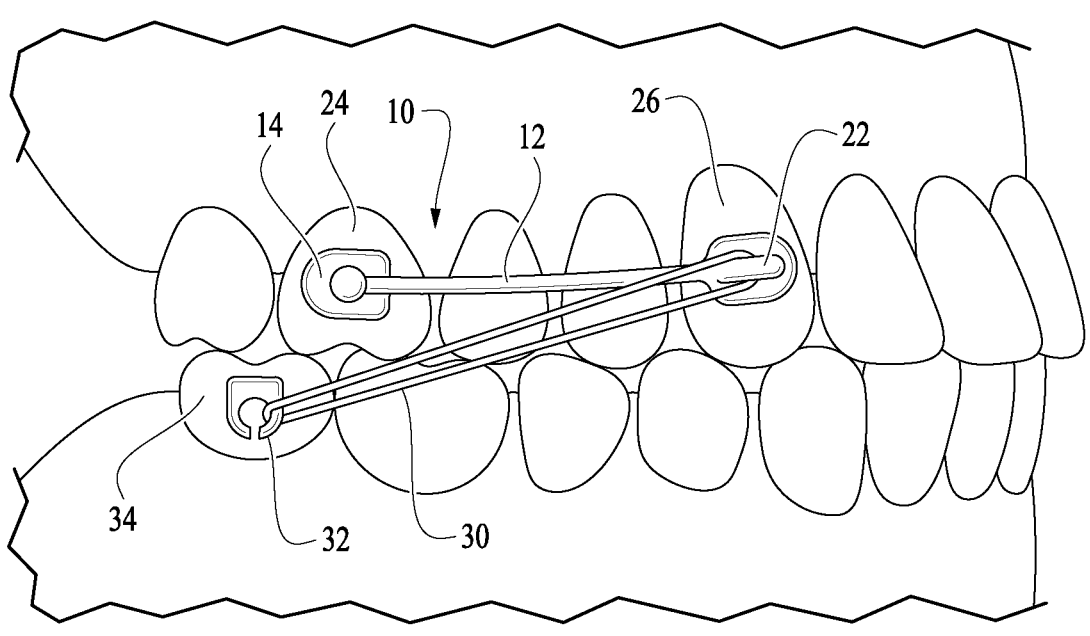
*ғɪɢ.2*
(Prior Art)

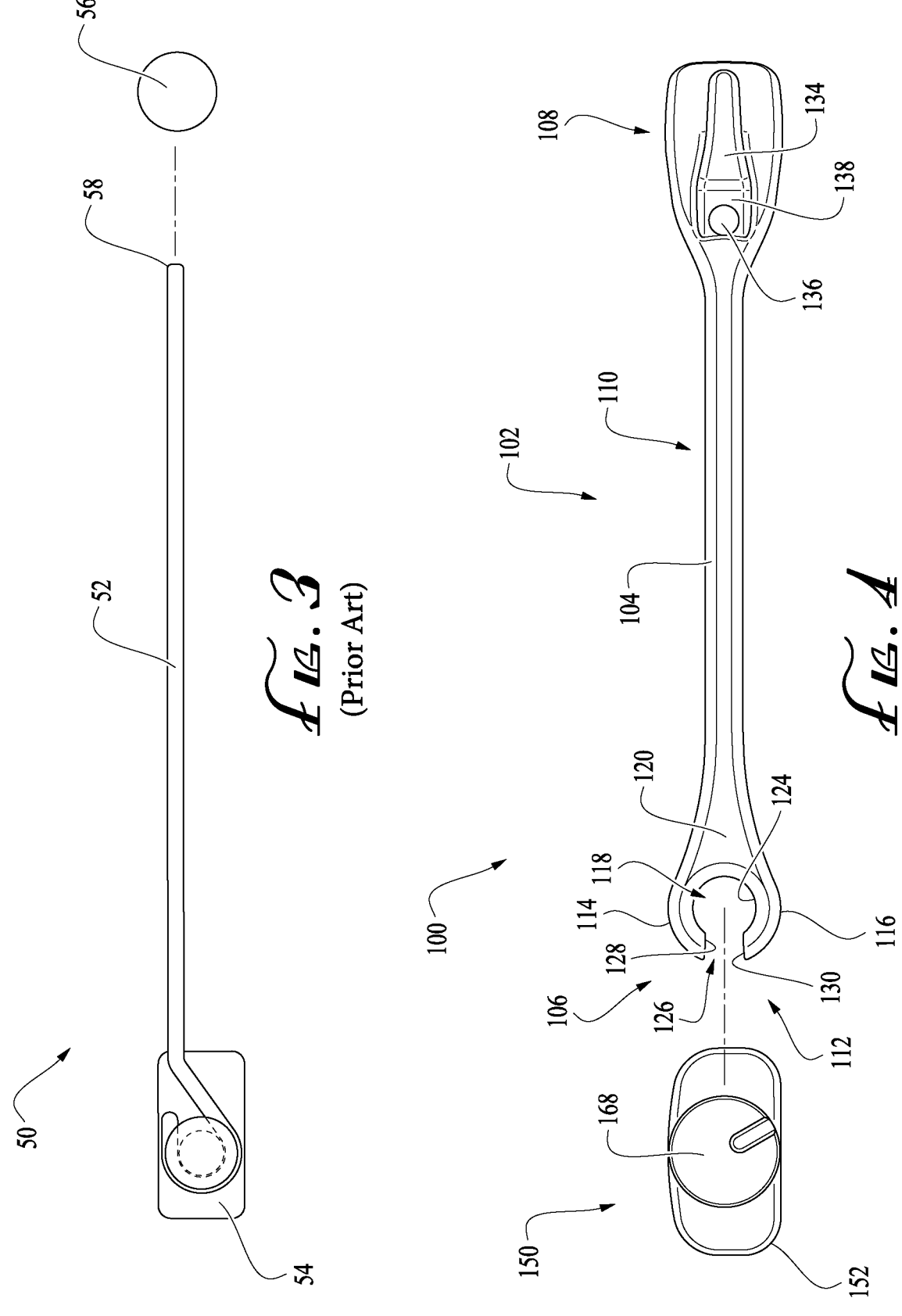
_Fig. 3_
(Prior Art)
_Fig. 4_

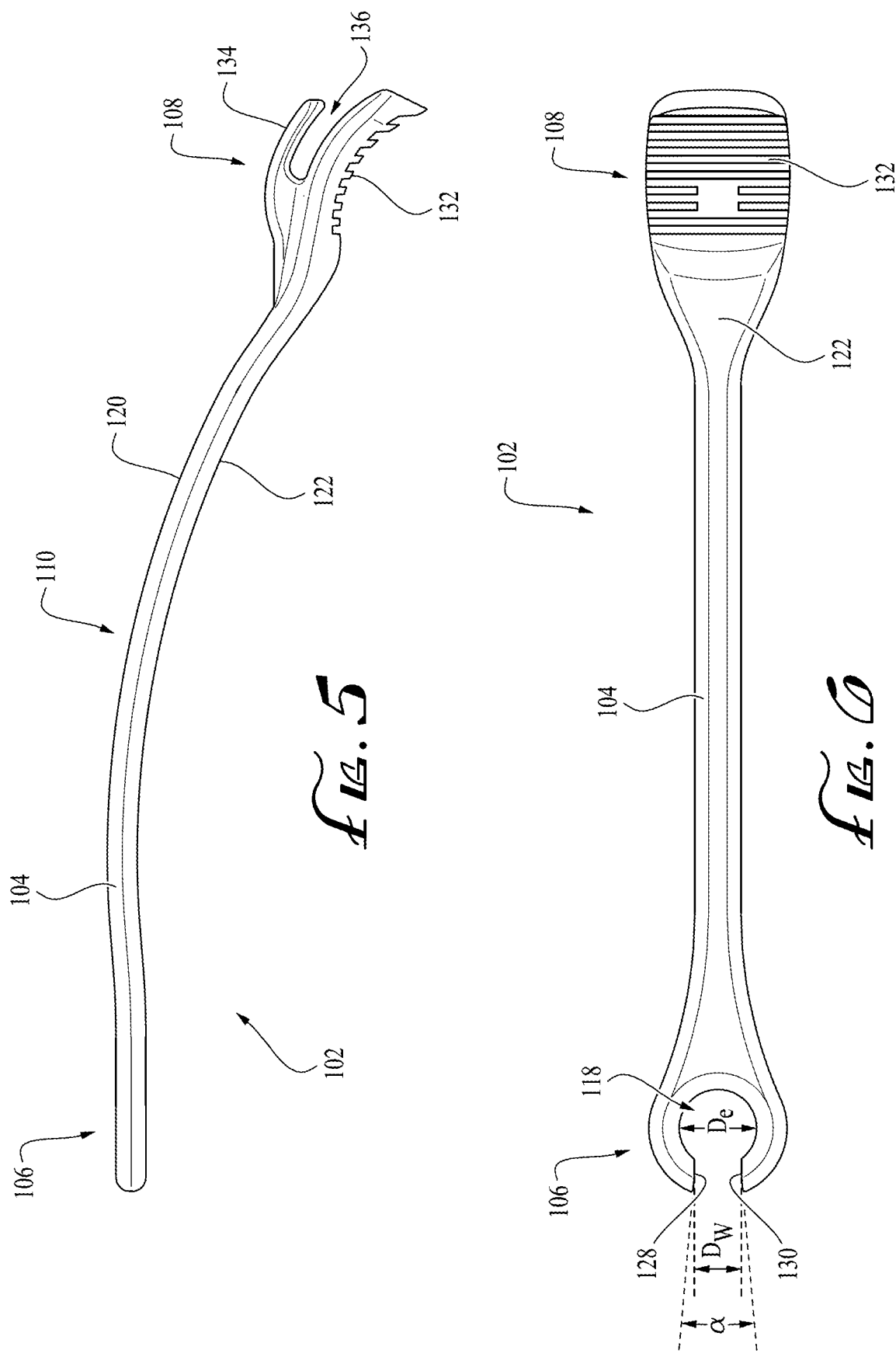
_Fig. 5_
_Fig. 6_

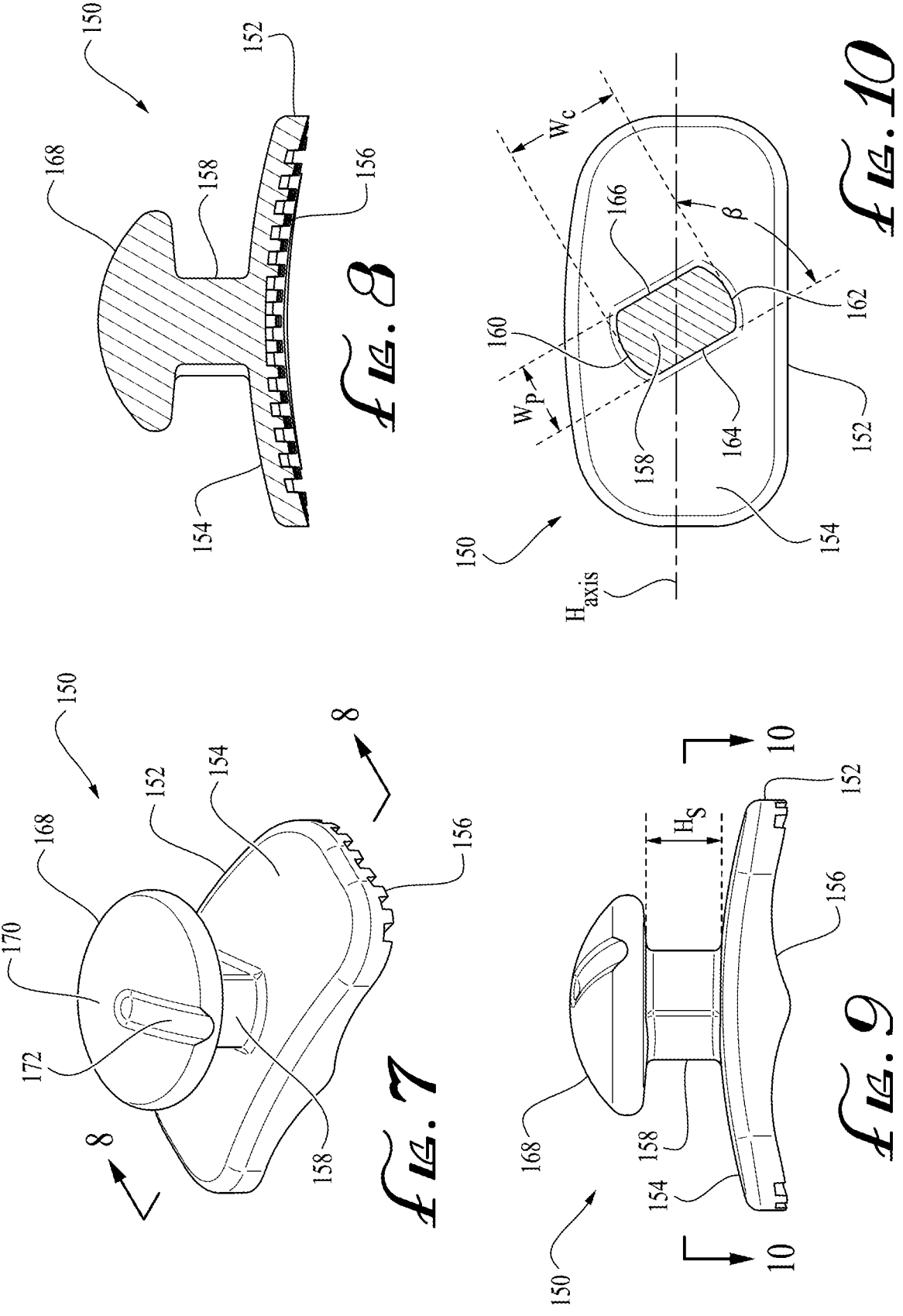

ORTHODONTIC APPLIANCE FOR CORRECTING MISALIGNMENT OF TEETH

RELATED APPLICATION DATA

This application is a nonprovisional of and claims the benefit under 35 U.S.C. § 119(e) of U.S. Provisional Patent Application No. 63/368,441, filed Jul. 14, 2022, the disclosure of which is incorporated by reference herein in its entirety.

BACKGROUND

The disclosure relates generally to the field of orthodontic appliances, and in particular, to such appliances designed for correcting a misalignment of a patient's teeth.

In orthodontics, a malocclusion generally refers to a misalignment of teeth in the upper and lower dental arches that typically results in an abnormal bite for the patient. Orthodontic devices, such as dental braces and correction devices, are commonly used to help align a patient's teeth and to address various other flaws generally relating to the teeth and jaw. During treatment, the corrective orthodontic appliance that is used typically depends on the severity and nature of the misalignment.

Malocclusions are commonly classified into three classes. A Class I malocclusion is generally characterized by a slight overlap of the upper teeth over the lower teeth. In these cases, the patient's bite is typically normal, but the teeth may have problems with spacing, crowding, and/or angular orientation (for example, the teeth may be angled rearwardly toward the tongue or forwardly toward the lips). In a Class II malocclusion (colloquially referred to as an overbite), the upper teeth stick out over the lower teeth and may be angled toward the tongue or lips in a similar fashion as a Class I malocclusion, but a Class II malocclusion is more severe and significantly impacts a patient's bite. Finally, in a Class III malocclusion (colloquially referred to as an underbite), the lower teeth stick out beyond the upper teeth, and may include teeth angled toward the tongue or lips, and/or may include teeth forming an abnormally shaped arch.

To address a Class I malocclusion, an orthodontic appliance may be used to gradually expand the upper jaw to create space for the teeth to erupt properly and in the correct alignment. If necessary, braces or other appliances may be used as a secondary measure to subsequently adjust and straighten the teeth. For Class II and Class III malocclusions, an orthodontic appliance may be used to gradually adjust the patient's bite and correct the misalignment. Typically, the goal of the treatment protocol for addressing a Class II or Class III malocclusion is to adjust the patient's teeth to attain a Class I condition. Thereafter, the same process as described above to correct the Class I malocclusion may be applied.

For Class II and Class III malocclusions, a wide variety of orthodontic devices have been developed to exert biasing forces on the mandible, either anteriorly or posteriorly as needed, to correct the malocclusion. One conventional orthodontic device includes a configuration utilizing a rigid, elongated arm that attaches along one end to a first tooth (typically a molar) and attaches along another end to a second tooth (typically a cuspid or bicuspid) on the same dental arch (such as the maxillary arch). This type of device also incorporates an elastic element (such as a rubber band) that attaches to the mesial end of the elongated arm and attaches to an anchor on a third tooth (such as a first or second molar) of the other dental arch (such as the mandibular arch). Once in position, the device applies the appropriate forces to correct the malocclusion over time.

The present inventors have found that conventional corrective devices for treating malocclusions are challenging to install, require unnecessary in-office labor, and/or lack a streamlined design. Accordingly, the present inventors have identified a need for an improved orthodontic correction device with a flexible design to optimize and simplify the installation procedure. Additional aspects and advantages will be apparent from the following detailed description of example embodiments, which proceeds with reference to the accompanying drawings.

BRIEF DESCRIPTION OF THE DRAWINGS

FIG. 1 illustrates a conventional orthodontic device in accordance with an example embodiment.

FIG. 2 illustrates the conventional orthodontic device of FIG. 1 in an example arrangement for correcting malocclusions in accordance with one embodiment.

FIG. 3 illustrates another conventional orthodontic device in accordance with an example embodiment.

FIG. 4 illustrates an orthodontic device for correcting malocclusions in accordance with one embodiment.

FIG. 5 is a side view of an arm of the orthodontic device of FIG. 4.

FIG. 6 is a bottom view of the arm of FIG. 5.

FIG. 7 is a perspective view of an anchor of the orthodontic device of FIG. 4.

FIG. 8 is a cross-section view taken along section 8-8 of the anchor of the orthodontic device of FIG. 7.

FIG. 9 is a front view of the anchor of FIG. 7.

FIG. 10 is a cross-section view taken along section 10-10 of the anchor of FIG. 9.

DETAILED DESCRIPTION OF EXAMPLE EMBODIMENTS

Figure 11:
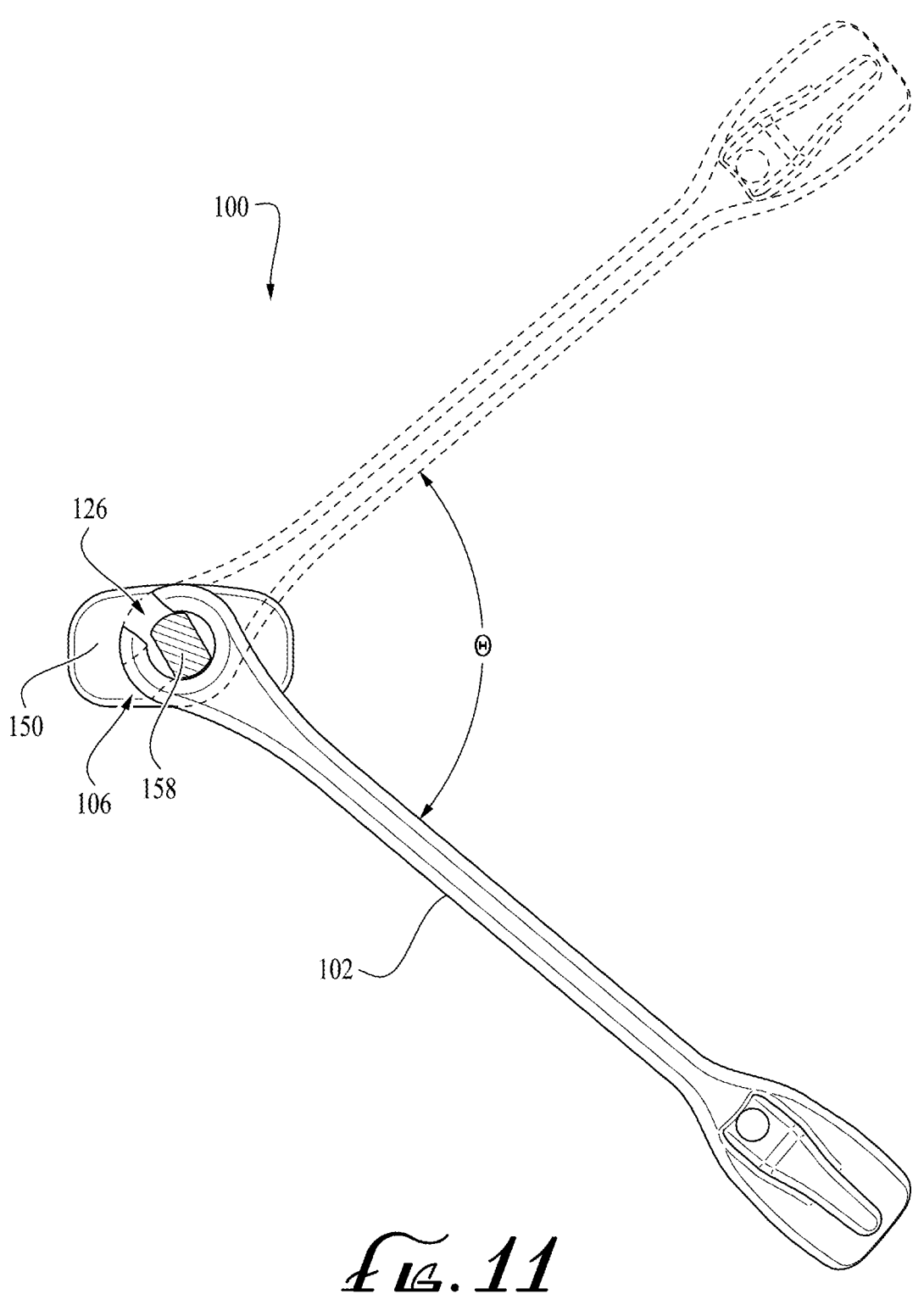
FIG. 11 illustrates an example rotational range in the occlusal-gingival direction for the arm relative to the anchor during an installation procedure of the orthodontic device (with an anchor cap removed) in accordance with one embodiment.

With reference to the drawings, this section describes various embodiments of an orthodontic device designed for treating malocclusions and its detailed construction and operation. Throughout the specification, reference to "one embodiment," "an embodiment," or "some embodiments" means that a described feature, structure, or characteristic may be included in at least one embodiment of the orthodontic device. Thus, appearances of the phrases "in one embodiment," "in an embodiment," or "in some embodiments" in various places throughout this specification are not necessarily all referring to the same embodiment. Further, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like.

The description below begins with a brief overview of conventional orthodontic devices used for treating malocclusions with reference to FIGS. 1-3, followed by a detailed description of an improved orthodontic device with collective reference to FIGS. 4-13. In the following description, particularly the passages relating to embodiments illustrated in FIGS. 4-13, certain components of the orthodontic device may be described in detail, while others may not be. It should be understood that in some instances, well-known structures, materials, or operations are not shown or described in detail to avoid obscuring more pertinent aspects of the illustrated embodiments. In addition, although the embodiments may illustrate and reference a specific orthodontic device design, other embodiments may include additional or fewer components than the described embodiments without departing from the principles of the disclosed subject matter.

FIG. 1 illustrates a conventional orthodontic device 10 in accordance with one embodiment, and FIG. 2 illustrates the orthodontic device 10 in an example arrangement for treatment in accordance with one embodiment. With collective reference to FIGS. 1 and 2, the orthodontic device 10 includes an arm 12 fixedly coupled to an anchor 14 via a ball-and-socket joint 16, where the arm 12 is capable of pivoting relative to the anchor 14. In some embodiments, the arm 12 of the orthodontic device 10 may be provided in various lengths to accommodate treatment opportunities for a wide variety of patients. The anchor 14 includes a mounting surface 18 for bonding the anchor 14 of the orthodontic device 10 to a patient's molar (or another suitable tooth). Likewise, the arm 12 includes a mounting surface 20 for bonding the arm 12 to a patient's cuspid (or other suitable tooth) as further described with reference to FIG. 2. The arm 12 further includes a hook 22 for attaching an elastic member 30, such as a rubber band or other suitable component, (see FIG. 2) for treatment.

With collective reference to FIGS. 1-2, in an example configuration for treating a malocclusion, the orthodontic device 10 is coupled to respective teeth of the patient's maxilla and mandible in the general fashion as illustrated. For example, in one embodiment, the mounting surface 18 of the anchor 14 is bonded to a maxillary molar 24, and the mounting surface 20 of the arm 12 is bonded to a maxillary cuspid 26. Both the anchor 14 and the arm 12 of the orthodontic device 10 are simultaneously mounted to the respective teeth 24, 26 to ensure that the orthodontic device 10 is properly positioning for treatment. Thereafter, the elastic member 30 is attached to the arm 12 via the hook 22 and coupled to a molar anchor 32 bonded to the second mandibular molar 34.

As noted previously, the inventors have identified several potential disadvantages relating to the orthodontic device 10. For example, the ball-and-socket joint 16 connecting the arm 12 and the anchor 14 is a complex solution that provides a limited pivoting action of the rigid arm 12 in all directions. In addition, the ball-and-socket joint 16 requires precision components and specialized assembly during the manufacturing processes, two variables that typically increase product cost. Further, the orthodontic device 10 is designed for bonding as a complete unit, such that the anchor 14 and the arm 12 are bonded to the patient's teeth simultaneously. This requirement makes proper installation more challenging and minimizes positional flexibility for the orthodontic device 10 during installation. Finally, the orthodontic device 10 includes an arm 12 permanently affixed to the anchor 14 via the ball-and-socket joint 16. Accordingly, if one component (e.g., the arm 12 or the anchor 14) of the orthodontic device 10 were to inadvertently detach from a patient's tooth, the orthodontic device 10 would be dangling freely in the patient's mouth via the other component. This situation would necessitate an emergency visit to a practitioner's office to re-bond the loose component to avoid discomfort and/or potential injury.

FIG. 3 illustrates another conventional orthodontic device 50 in accordance with one embodiment. With reference to FIG. 3, the orthodontic device 50 includes a rigid arm 52 coupled to an anchor 54 along one end of the arm 52. The orthodontic device 50 further includes a second anchor 56 designed to receive a second end 58 of the arm 52. The arm 52 is typically provided in a long length designed to be cut by a practitioner to suit a particular patient's need as further described below.

For example, in one installation procedure of the orthodontic device 50, the arm 52 is initially cut to a desired length by the practitioner. After the arm 52 is cut to a desired length, the second end 58 of the arm 52 is inserted by the practitioner into a small opening or hole (not shown) in the anchor 56 to set the arm 52 in position. Thereafter, the orthodontic device 50 is bonded to a patient's maxilla via the anchors 54, 56 (along with an elastic member—not shown) in a generally similar process as described with reference to FIG. 2. As with the orthodontic device 10 of FIG. 1, the orthodontic device 50 of FIG. 3 is designed for bonding to the patient's teeth as a unit, where the anchors 54, 56 are simultaneously bonded to a patient's molar and cuspid along the maxillary arch.

While the design of the orthodontic device 50 may provide some flexibility by incorporating an arm 52 that can be cut to a desired length for individualized treatment, one primary disadvantage of this design is that it requires significant in-office labor both to appropriately size the arm 52 and to ensure it remains firmly secured within the anchor 56 during installation. In addition, if the arm 52 detaches from the anchor 56, this situation would require an emergency visit to a practitioner's office for handling. In some procedures, the anchor 56 would have to be de-bonded, the arm 52 would have to be inserted into the anchor 56, then the anchor 56 with the arm 52 in place re-bonded to the tooth. Moreover, the orthodontic device 50 is also designed for simultaneous bonding of the anchors 54, 56, thereby increasing its difficulty of installation in a similar fashion as described with reference to the orthodontic device 10 of FIGS. 1-2.

With collective reference to FIGS. 4-13, the following description provides details for an orthodontic device 100 designed to provide various improvements over conventional designs, including: to facilitate installation for treatment, to simplify repair and replacement of individual components in the event of dislodgement, and to streamline product manufacture with a simple component design, among others. Briefly, FIG. 4 illustrates components of the orthodontic device 100 for correcting malocclusions in accordance with one embodiment. As illustrated, the orthodontic device 100 generally includes an arm 102 designed to removably couple with an attachment anchor 150, where the arm 102 is insertable into and rotatable relative to the anchor 150 to facilitate treatment as further described below. Details relating to the arm 102, anchor 150, and their overall functionality are provided below as follows.

Figures 12, 13:
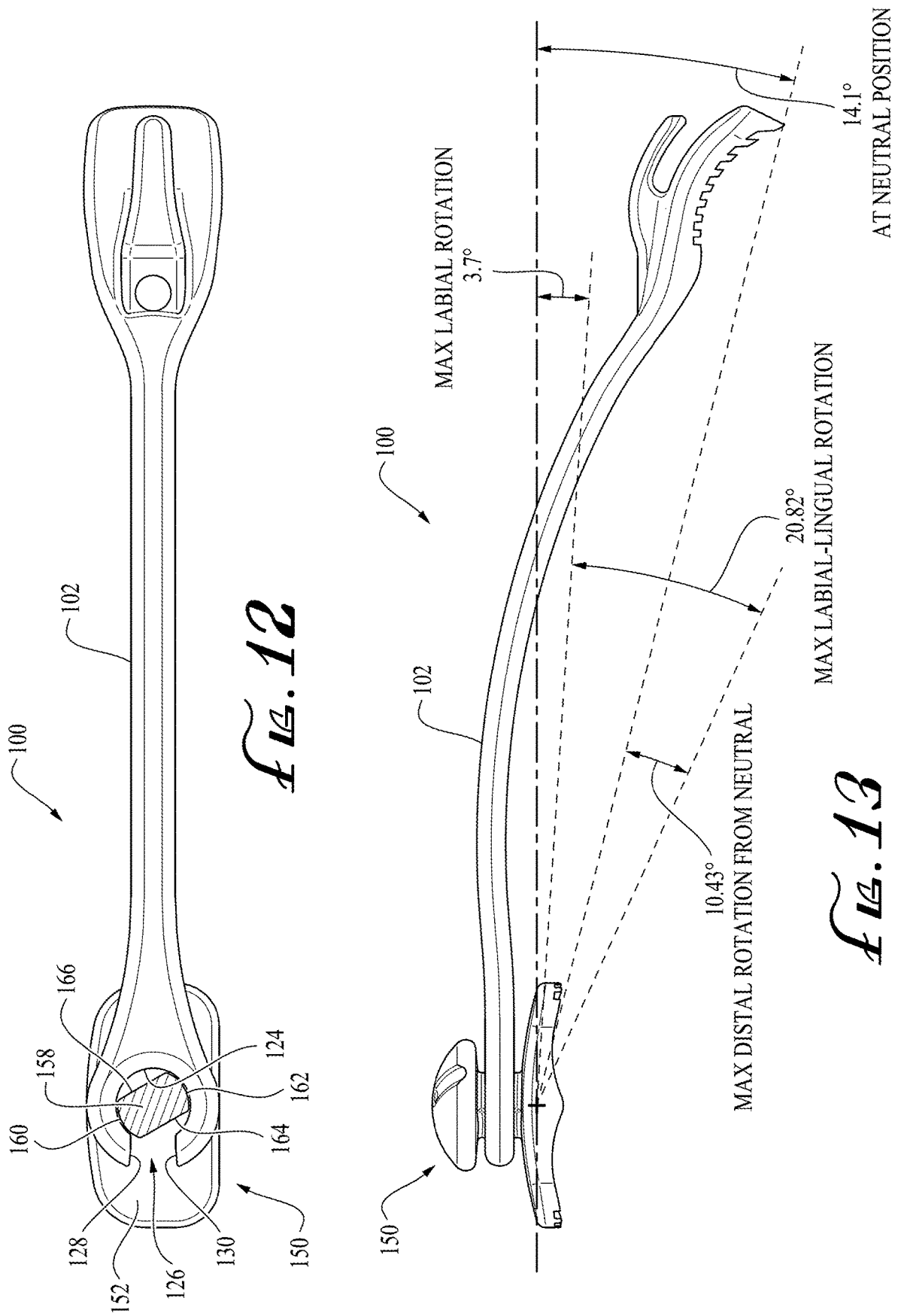
FIG. 12 is a top view of the orthodontic device (with the anchor cap removed) illustrating the arm and anchor in a mated configuration.
FIG. 13 illustrates an example rotational range for the arm relative to the anchor in the labial-lingual direction in accordance with one embodiment.

With general reference to FIGS. 4-6, the following begins with a detailed description of the features of the arm 102, followed by a description of the features of the anchor 150 with reference to FIGS. 7-10, and finally a description of the cooperation between the arm 102 and the anchor 150 to achieve the overall functionality of the orthodontic device 100 with reference to FIGS. 11-13.

FIGS. 4-6 collectively illustrate details of the arm 102 of the orthodontic device 100 in accordance with one embodiment. With particular reference to FIG. 4, the arm 102 includes an elongate body 104 having an attachment portion 106 along one end of the body 104 and a bonding portion 108 along an opposite end of the body 104. The arm 102 may have any suitable length as needed to accommodate treatment for a wide variety of patients. For general reference purposes, the attachment portion 106 is configured to couple the arm 102 with the anchor 150 and the bonding portion 108 is configured to bond the arm 102 to a patient's tooth as further described in detail below with reference to FIGS. 11-13. As illustrated in FIG. 5, a substantially central portion 110 of the body 104 between the attachment portion 106 and the bonding portion 108 is curved. This curvature is designed to generally track the curvature of a patient's dental arch and is designed to help ensure the arm 102 clears the patient's teeth when the orthodontic device 100 is installed for treatment (see FIG. 2 for example).

Returning to FIG. 4, the attachment portion 106 of the arm 102 includes an end face 112 that may be substantially rounded or curved (although other suitable profiles may be implemented), the end face 112 having a first segment 114 and a second segment 116. In embodiments with a rounded end face 112, the segments 114, 116 may each have rounded exterior profiles in a similar fashion as shown in FIG. 4. It should be understood that in other embodiments where the end face 112 may have a different, non-rounded profile, the segments 114, 116 may similarly include a matching, non-rounded profile.

The arm 102 further includes an eyelet 118 formed along the attachment portion 106, the eyelet 118 extending through the arm 102 from a top surface 120 of the body 104 through to an opposite bottom surface 122 (see FIG. 6) of the body 104. The eyelet 118 is at least partially surrounded along an interior portion of the arm 102 by an interior wall 124, where the eyelet 118 and the interior wall 124 are generally sized and dimensioned to receive the anchor 150 and lock the arm 102 in place as described in further detail below. It should be understood that while the interior wall 124 is illustrated as a rounded interior surface in the illustrated embodiment, the shape of the interior wall 124 may be altered to generally correspond with any suitable shape of the anchor 150 (particularly the stem 158 of the anchor 150) as further described below.

With reference to FIG. 4, the end face 112 of the attachment portion 106 further includes a notch 126 formed as a cutaway region along the end face 112, where the notch 126 creates a passageway from the exterior of the arm 102 into the eyelet 118 and the interior wall 124, where the eyelet 118 and interior wall 124 collectively form a seat for receiving the stem 158 of the anchor 150. In view of the notch 126, the attachment portion 106 includes a first wall 128 spanning between an end of the first segment 114 of the end face 112 and a first portion of the interior wall 124, and also includes a second wall 130 spanning between an end of the second segment 116 of the end face 112 and a second portion of the interior wall 124. In some embodiments, the respective surfaces of the first wall 128 and the second wall 130 may be arranged at an angle α (see FIG. 6) of approximately 10 degrees to help facilitate insertion of the arm 102 into the anchor 150. In other embodiments, the angle α may range from about 0 degrees (in which case the first wall 128 and the second wall 130 are substantially parallel relative to one another) to about 20 degrees. In still other embodiments, the walls 128, 130 may be arranged at other suitable angles relative to one another. As illustrated, the end face 112 of the attachment portion 106, including the eyelet 118 and the notch 126, may have a generally C-shaped configuration in accordance with one embodiment.

Turning now to FIGS. 5 and 6, the bonding portion 108 of the arm 102 includes a bonding surface 132 formed on the underside of the arm 102 along the bottom surface 122. In some embodiments, the bonding surface 132 may include grooves, channels, or other surface features designed to receive an adhesive or other suitable bonding agent to attach the bonding portion 108 of the arm 102 to a patient's tooth. With particular reference to FIG. 5, the arm 102 further includes a hook 134 formed along the top surface 120 of the arm 102. The hook 134 includes a gap or slot 136 underneath to collectively provide a seat for receiving a rubber band or other suitable elastic member (not shown) during treatment in a similar fashion as described previously with reference to the orthodontic device 10 of FIGS. 1-2. In some embodiments, the hook 134 includes an indicator marking 136, such as a color marking or other suitable indicator, disposed on a top surface 138 thereof, where the indicator marking 136 is easily visible to ensure the arm 102 is oriented in the proper configuration for coupling with the anchor 150 (see FIG. 4). When the arm is in the proper configuration for installation, the indicator marking 136 is fully visible along the top surface 120 of the arm 102 as shown in FIG. 4.

With reference to FIGS. 7-10, the follow describes features and characteristics of the anchor 150 of the orthodontic device 100 in accordance with one embodiment. With particular reference to FIG. 7, the anchor 150 includes an attachment base 152 having a top surface 154 and an opposite bottom surface 156. The bottom surface 156 of the attachment base 152 may include grooves, channels, or other surface features designed to receive an adhesive or other suitable bonding agent to attach the anchor 150 to a selected patient's tooth (see also FIG. 8). The anchor 150 includes a stem 158 extending upwardly from the top surface 154 of the attachment base 152 and a cap 168 positioned atop the stem 158. In some embodiments, the stem 158 and the cap 168 are integrally formed as unitary components. In other embodiments, the cap 168 may instead be formed as a separate component designed to mate with the stem 158. For example, the cap 168 and stem 158 may include mating threaded sections (not shown) for attaching the cap 168 to the stem 158. With collective reference to FIGS. 9-10, the following description relates to additional features of the stem 158.

FIG. 9 a front view of the anchor 150, and FIG. 10 is a cross-section view taken along section 10-10 of the anchor of FIG. 9 to illustrate particular features and a profile of the stem 158 in accordance with one embodiment. With particular reference to FIG. 10, in one embodiment, the stem 158 includes a first circular segment 160 and a second circular segment 162 arranged opposite one another, and also includes a first planar segment 164 and a second planar segment 166 arranged opposite one another. As illustrated, the first planar segment 164 spans between the first circular segment 160 and the second circular segment 162 along one side of the stem 158, and the second planar segment 166 spans between the first circular segment 160 and the second circular segment 162 along the other side of the stem 158. In this configuration, the planar segments 164, 166 are arranged in a substantially parallel configuration relative to one another. In some embodiments, the planar segments 164, 166 are each oriented at an angle β of approximately 60 degrees relative to a horizontal axis $H_{axis}$ extending lengthwise through the attachment base 152 and the stem 158 as illustrated to simplify the installation process as further described below. In other embodiments, the planar segments 164, 166 may be arranged at other suitable angles relative to the horizontal axis $H_{axis}$, such as between 55 degrees to 65 degrees, or between 45 degrees to 75 degrees, or between 30 degrees to 90 degrees.

In some embodiments, the planar segments 164, 166 are spaced apart from one another by a width $W_p$. The width $W_p$ is preferably substantially equal to or slightly less than the distance $D_w$ separating the first and second walls 128, 130 adjacent the notch 126 of the attachment portion 106 of the arm 102 (see FIG. 6). For example, in one embodiment, the width $W_p$ may be 0.050 inches±0.002 inches and the distance $D_w$ may be 0.051 inches±0.002 inches. In other embodiments, the dimensions may differ. In some embodiments, the distance $D_w$ may be approximately 1%-3% larger than the corresponding distance width $W_p$.

In some embodiments, the circular segments 160, 162 are spaced apart from one another by a width $W_c$ (see FIG. 10). The width $W_c$ is preferably substantially equal to or slightly less than the diameter $D_e$ of the eyelet 118 of the attachment portion 106 of the arm 102 (see FIG. 6). For example, in one embodiment, the width $W_c$ may be 0.080±0.002 inches and the diameter $D_e$ may be 0.0840±0.0025 inches/0.0010 inches. In other embodiments, the dimensions may differ. In some embodiments, the diameter $D_e$ may be approximately 2%-8% larger than the corresponding distance width $W_c$.

The small relative difference in dimensions of the above-referenced components for the arm 102 and the anchor 150 helps ensure that the arm 102 is securely coupled to the anchor 150 during installation of the orthodontic device 100, and also helps facilitate rotation of the arm 102 relative to the anchor 150 as further described below with reference to FIGS. 11-13.

Returning to FIG. 7, the anchor 150 includes a cap 168 positioned on top of the stem 158. Preferably, the cap 168 has a generally rounded profile and an outer diameter larger than a corresponding width (e.g., the width WO of the stem 158. The larger cap 168 acts to limit upward movement of the attachment portion 106 of the arm 102 based on a height, Hs, of the stem 158 when the arm 102 is coupled to the anchor 150 (see FIG. 9). In some embodiments, a top surface 170 of the cap 168 includes an indicator marking 172 visible thereon, such as a colored segment or other suitable marking, to help the practitioner determine a proper alignment for the anchor 150 since the cap 168 may obscure the position of the planar segments 164, 166 when the anchor 150 is moved into position for bonding to a patient's tooth (see FIG. 4 for example). Accordingly, in some embodiments, the indicator marking 172 may be aligned along an axis parallel to the planar segments 164, 166 of the stem 158 to visibly indicate to the practitioner the relative position and angular orientation of the planar segments 164, 166. The indicator marking 172 also helps ensure the anchor 150 is properly positioned on the patient's tooth with the planar segments 164, 166 properly oriented to facilitate insertion of the attachment portion 106 of the arm 102 as further described below.

With reference to FIGS. 11-13, the following describes an example coupling and installation process for the orthodontic device 100 in accordance with one embodiment. It should be understood that while the installation process described below provides a suggested order of steps for the installation, the steps may be completed in a different order in other embodiments without departing from the principles of the disclosed subject matter.

With reference to the figures, the installation process begins with the practitioner bonding the anchor 150 onto a selected tooth of the patient. In one example, the anchor 150 may be bonded on a molar (or other suitable posterior tooth) along the maxillary arch of the patient (in a similar fashion as generally described with reference to FIG. 2). As noted previously, the anchor 150 may be bonded onto the patient's tooth using an adhesive or bonding agent on the bottom surface 156 of the attachment base 152. To ensure that the anchor 150 is arranged in the proper orientation for receiving the arm 102 (in particular, to ensure that the first and second planar segments 164, 166 of the stem 158 are properly oriented), the practitioner may refer to a position and orientation of the indicator marking 172 on the cap 168 as a visual cue. As noted above, the indicator marking 172 on the cap 168 may align with (or otherwise indicate) the angular orientation of the first and second planar segments 164, 166 of the stem 158 relative to the attachment base 152.

Once the anchor 150 is bonded in a suitable position on the patient's tooth, the anchor 150 is ready for receiving the attachment portion 106 of the arm 102. With particular reference to FIG. 11, the attachment portion 106 is positioned such that the notch 126 aligns with the first and second planar segments 164, 166 of the stem 158. In instances where the first and second planar segments 164, 166 are obscured from view by the cap 168, the practitioner may align the notch 126 using the indicator marking 172 to ensure the notch 126 is in the appropriate position for insertion into the stem 158.

Thereafter, the attachment portion 106 of the arm 102 is advanced toward the stem 158, with the first and second planar segments 164, 166 aligning with the notch 126. During insertion into the stem 158, one or both of the first and second planar segments 164, 166 may slide against a corresponding one or both of the first and second walls 128, 130 adjacent the notch 126. Once properly aligned, the attachment portion 106 is advanced toward the stem 158 until the stem 158 is seated within the eyelet 118, with one of the circular segments 162 abutting against the interior wall 124 of the arm 102 and the other of the circular segments 160 positioned adjacent the notch 126 as illustrated in FIG. 11.

Thereafter, the arm 102 is rotated relative to the anchor 150 until the arm 102 is in a substantially horizontal position to lock the arm 102 onto the stem 158 (see FIG. 12). For reference purposes, the arm 102 is generally in the horizontal position when the orthodontic device 100 is installed on the patient's teeth (similar to the arrangement shown in FIG. 2). In the illustrated example of FIGS. 11-12, the arm 102 is rotated across an angle of approximately 60 degrees since the first and second planar segments 164, 166 are angled 60 degrees relative to the horizontal axis $H_{axis}$ as described previously. In some embodiments, the arm 102 may be rotatable relative to the anchor 150 through an angle $\Theta$ that may range up to 80 degrees (see FIG. 11). In still other embodiments, the arm 102 may be rotated through any suitable angular range depending primarily on the angle of the first and second planar segments 164, 166 of the anchor 150.

With reference to FIG. 12, when the arm 102 is in the locked horizontal position, the first and second circular segments 160, 162 of the stem 158 are seated against and contact portions of the interior wall 124 surrounding the eyelet 118. For clarity, depending on the relative dimensions of the stem 158 and the notch 126, a portion of the first circular segment 160 may be adjacent the notch 126 and not contact the interior wall 124 as shown in FIG. 12. As illustrated in FIG. 12, the second planar segment 166 is positioned within the eyelet 118 adjacent the interior wall 124 and the first planar segment 164 is positioned within the eyelet 118 adjacent the notch 126. In this configuration, the stem 158 and the interior wall 124 (primarily via contact between the first and second circular segments 160, 162 and the interior wall 124) together cooperate to resist inadvertent dislodgement of the arm 102 from the anchor 150. In addition, the cap 168 limits movement of the arm 102 upwardly along the stem 158 to prevent dislodgment in the labial-lingual direction.

Once the arm 102 is in the locked position against the anchor 150, the bonding portion 108 of the arm 102 may be bonded via the bonding surface 130 to another tooth, such as a cuspid (or other suitable anterior tooth), along the maxillary arch (in a similar overall position as shown in FIG. 2). Thereafter, a second anchor (not shown, but may be any suitable anchor design with a hook for receiving an elastic member) is bonded to another tooth of the patient (such as a second molar) along the mandible. Finally, an elastic member (such as elastic member 30 of FIG. 2) is coupled to the seat 136 underneath the hook 134 of the arm 102 and also coupled to the second anchor on the mandibular arch in an overall similar arrangement as illustrated in FIG. 2 to complete the installation.

As illustrated in FIG. 13, the improved design and attachment method of the orthodontic device 100 provides flexibility and movement of the arm 102 in the labial/lingual and occlusal/gingival directions that exceed clinical needs without compromising the integrity of the arm's 102 connection to the anchor 150. Currently, clinical needs require less than 5 degrees of motion in the labial/lingual direction and less than 10 degrees of motion in the occlusal/gingival direction. The orthodontic device 100 and its installation method described herein provides at least 10.4 degrees of motion in the labial/lingual direction from the neutral position and at least 80 degrees of total movement in the occlusal/gingival direction (see FIG. 11).

As described with particular reference to the embodiments of FIGS. 4-13, the streamlined design of the orthodontic device 100 facilitates the coupling of the arm 102 to the anchor 150 to simplify the overall installation of the orthodontic device 100 onto the patient's teeth for treatment. In addition, because the arm 102 is separate from the anchor 150, each component may be bonded to a patient's tooth independently from the other. The ability to independently bond these components helps simplify the installation process by eliminating the need for simultaneously bonding multiple components as in some conventional designs, and also helps improve the accuracy and quality of component placement, both of which raise the likelihood that the components of the orthodontic device 100 will remain properly engaged during treatment when compared to conventional devices. It should be noted that while the design of the orthodontic device 100 accommodates individual bonding of the anchor 150 and the arm 102 as described herein, the orthodontic device 100 may also be bonded as a unit if desired by the practitioner. For example, the arm 102 may be inserted into the anchor 150 and rotated to a desired position, and both components may thereafter be simultaneously bonded onto the patient's teeth.

As described, the conventional orthodontic device 10 of FIGS. 1-2 is a unitary assembly that requires simultaneous bonding along the molar and cuspid because the anchor 14 and arm 12 cannot be disassembled and retain the device's intended functionality. While individual bonding of the conventional device 50 of FIG. 3 is technically possible, precise placement of the molar anchor 54 and cuspid anchor 56 is critical to ensure the arm 52 remains properly engaged. The propensity for the arm 52 to slip out of the cuspid anchor 56 during clinical use increases if the molar anchor 54 and cuspid anchor 56 are placed too far apart. Simply put, the design of the orthodontic device 100 is simple and cost-effective, while the conventional devices require sophisticated installation methods, costly components, or subsequent in-office fabrication and assembly.

Further, the design of the orthodontic device 100 allows practitioners to reduce inventory cost by purchasing anchors 150 designed for installation on the left or right side of the patient's mouth along with an arm 102 of various lengths as needed to suit patient needs. In addition, the orthodontic device 100 is designed to minimize in-office labor and avoid the need to cut components to size during installation. As described above, the design of the orthodontic device 100 meets clinical needs while providing flexibility, optimizing inventory costs, and minimizing installation labor, benefits not offered by conventional devices.

It should be understood that while the figures illustrate an example design for an orthodontic device, other configurations may be possible without departing from the principles of the disclosed subject matter. In addition, although the description above contains much specificity, these details should not be construed as limiting the scope of the disclosed subject matter, but as merely providing illustrations of some embodiments. It should be understood that subject matter disclosed in one portion herein can be combined with the subject matter of one or more of other portions herein as long as such combinations are not mutually exclusive or inoperable.

The terms and descriptions used above are set forth by way of illustration only and are not meant as limitations. It will be obvious to those having skill in the art that changes may be made to the details of the above-described embodiments without departing from the underlying principles of the disclosed subject matter.

The invention claimed is:

1. An orthodontic device for treating misalignment of teeth, the device comprising:

an anchor including an attachment base having a top surface and an opposite bottom surface, the anchor further including a stem extending upwardly from the top surface of the attachment base, wherein the stem includes a first planar segment and a second planar segment disposed parallel to one another, the first planar segment and the second planar segment oriented at an angle relative to a horizontal axis extending across the attachment base of the anchor;

an indicator marking formed on the anchor and aligned along an axis parallel to the first and second planar segments, the indicator marking indicating an angular orientation of the first planar segment and the second planar segment relative to the attachment base of the anchor; and an arm including an elongate body having a top surface and an opposite bottom surface, the elongate body further including an attachment portion disposed along one end thereof and a bonding portion disposed along an opposite end thereof, the bonding portion including a bonding surface mountable to a tooth, the bonding surface formed along the bottom surface of the elongate body, wherein the attachment portion includes a seat, the seat receiving the stem of the anchor to removably mount the arm to the anchor, and wherein the arm is rotatable about a rotational axis relative to the stem when the stem is in the seat.

2. The orthodontic device of claim 1, wherein the attachment portion further includes a notch formed along an end face thereof, the notch in communication with the seat and providing a passageway for the stem from the end face to the seat.

3. The orthodontic device of claim 2, wherein the seat further includes an eyelet formed along the attachment portion and an interior wall at least partially surrounding the eyelet.

4. The orthodontic device of claim 1, wherein the stem further includes a first circular segment and a second circular segment offset from one another, and wherein the first planar segment spans between the first circular segment and the second circular segment along a first side of the stem, and wherein the second planar segment spans between the first circular segment and the second circular segment along a second side of the stem.

5. The orthodontic device of claim 1, wherein the anchor further includes a cap atop the stem, and wherein the cap includes the indicator marking formed on a top surface thereof.

6. The orthodontic device of claim 1, wherein the seat further includes an interior wall, and wherein at least a first portion of the stem abuts the interior wall when the arm is mounted to the stem, and wherein at least a second portion of the stem rides against the interior wall as the arm is rotated relative to the stem.

7. The orthodontic device of claim 6, the stem further including a first circular segment and a second circular segment offset from one another, wherein the first planar segment spans between the first circular segment and the second circular segment along a first side of the stem, and wherein the second planar segment spans between the first circular segment and the second circular segment along a second side of the stem, and wherein one or both of the first circular segment and the second circular segment of the stem rides against the interior wall as the arm is rotated relative to the stem.

8. The orthodontic device of claim 1, wherein the arm further includes a hook formed along the top surface thereof, the hook configured for receiving an elastic member along a first portion thereof.

9. The orthodontic device of claim 8, further comprising a second anchor configured for receiving the elastic member along a second portion thereof.

10. The orthodontic device of claim 1, wherein the elongate body further includes curved central portion positioned between the attachment portion and the bonding portion.

11. A method for installing an orthodontic device for treating misalignment of teeth, the method comprising:
coupling an anchor to a first tooth along a first dental arch, the anchor including an attachment base having a top surface and an opposite bottom surface, the anchor further including a stem extending upwardly from the top surface of the attachment base, wherein the stem includes a first planar segment and a second planar segment oriented at an angle relative to a horizontal axis extending across the attachment base of the anchor;
aligning an attachment portion of an arm with an indicator marking formed on the anchor and aligned along an axis parallel to the first planar segment and the second planar segment, the indicator marking indicating an angular orientation of the first planar segment and the second planar segment relative to the attachment base of the anchor;
inserting the attachment portion of the arm into the stem of the anchor along a seat formed on the arm;
driving the arm into the stem to position the stem within the seat of the arm;
rotating the arm about a rotational axis relative to the stem while the arm is positioned within the seat; and
coupling a bonding portion of the arm to a second tooth along the first dental arch, wherein the attachment portion and the bonding portion are disposed along opposite ends of the arm.

12. The method of claim 11, the attachment portion of the arm including a notch formed along an end face thereof, the notch in communication with the seat and providing a passageway for the stem from the end face to the seat, wherein aligning the attachment portion of the arm includes aligning the notch of the attachment portion with the stem.

13. The method of claim 12, wherein aligning the notch further includes aligning the notch relative to the first planar segment and the second planar segment.

14. The method of claim 13, the anchor further including a cap formed atop the stem, the cap including the indicator marking formed thereon, wherein aligning the notch of the attachment portion relative to the first planar segment and the second planar segment further includes aligning the notch of the attachment portion of the arm with the indicator marking on the cap.

15. The method of claim 11, wherein rotating the arm about the rotational axis further includes rotating the arm to a locked position that is parallel to a horizontal axis extending across the attachment base and through the stem of the anchor.

16. The method of claim 11, further comprising:
bonding a second anchor to a patient's tooth along a second dental arch;
coupling a first portion of an elastic member to a hook formed on the arm; and
coupling a second portion of the elastic member to the second anchor.

17. The method of claim 11, wherein the arm includes an elongate body, and wherein a central portion of the elongate body between the attachment portion and the bonding portion is curved.

* * * * *